3,361,819
Patented Jan. 2, 1968

3,361,819
PROCESS FOR PRODUCING CHLORINE-SUBSTITUTED AROMATIC AMINES
John Richard Kosak, Wilmington, Del., and Louis Spiegler, Woodbury, N.J., assignors to E. I. du Pont de Nemours and Company, Wilmington, Del., a corporation of Delaware
No Drawing. Filed June 5, 1964, Ser. No. 373,037
7 Claims. (Cl. 260—580)

ABSTRACT OF THE DISCLOSURE

Process for preparing chloroanilines that may contain methyl substituents which comprises hydrogenating the corresponding chloronitrobenzene in a reaction mixture in which the amount of the chloronitrobenzene is between 1% and 50% by total weight. The amounts of chlorohydrazo aromatic hydrocarbon impurities produced are held to a minimum by this process.

This invention is directed to an improved and novel process for producing chlorine-substituted aromatic amines. More particularly, the present invention relates to an improvement for preparing chlorine-substituted monocarbocyclic aromatic amines bearing 1 or 2 chlorine atoms, which improvement consists of conducting the entire hydrogenation of a chlorine-substituted nitro monocarbocyclic aromatic hydrocarbon bearing 1 or 2 chlorine atoms in a mixture of the chloronitro compound and the corresponding chloroaromatic amine, in which mixture the amount of the chloronitro compound is between 1% and 50% by weight of the total mass. The result of this novel procedure is that the corresponding chlorohydrazo aromatic hydrocarbon impurity in the chloroaromatic amine product is significantly held to an acceptable minimum.

The chlorine-substituted monocyclic aromatic amines which may be prepared according to the present novel process in a high state of purity relative to the chlorohydrazo compounds associated with them include mono- and dichloro-anilines, toluidines, and xylidines. Specific examples are o-, m-, and p-chloroaniline, 2,4-dichloroaniline, 2,5-dichloroaniline, 3,4-dichloroaniline, 3,5-dichloroaniline, 3-chloro-p-toluidine, 4-chloro-o-toluidine and 5-chloro-2,4-xylidene.

In a customary preparation of these chloroaromatic amines, the corresponding chloronitro compound is hydrogenated at about 100° C. under about 500 p.s.i.g. hydrogen pressure in the presence of a platinum hydrogenation catalyst and a dechlorination suppressor or inhibitor. Such a dechlorination inhibitor is morpholine or piperazine or an N-methyl or N-ethyl derivative thereof. During the hydrogenation under these conditions, a small part of the chloronitro compound is reduced only to the corresponding chlorohydrazo aromatic hydrocarbon, which is contained in the chloroaromatic amine product in amounts up to about 1.0% by weight. The chlorohydrazo compound renders the chloroaromatic amine commercially unacceptable for some uses without purification. One of the objections to the presence of the chlorohydrazo compound is that it causes some end products made from a chloroaromatic amine containing it to be unsatisfactory in color and purity. Under the best controlled hydrogenation conditions, the chloroaromatic amines commonly produced contain the corresponding hydrazo compound in detrimental amounts.

It is, therefore, an object of this invention to provide a novel process for producing a chloroaromatic amine of improved quality. Another object is to provide such a novel process for producing a commercially acceptable chloroaromatic amine directly by hydrogenation of the corresponding chloronitro compound. A further object is to provide a novel process for producing a chloroaromatic amine containing a minimum amount of the corresponding chlorohydrazo compound.

These and other objects of the present invention will be apparent from the following description and claims.

More specifically, the present invention may be defined as that process of producing a chlorine-substituted monocarbocyclic aromatic amine bearing 1 to 2 chlorine atoms by the hydrogenation of the corresponding chlorine-substituted nitromonocarbocyclic aromatic hydrocarbon in the presence of a platinum hydrogenation catalyst and a dechlorination inhibitor, wherein the improvement consists of conducting said hydrogenation in a mixture of the aromatic amine and the corresponding nitro compound in which the amount of the nitro compound is between 1% and 50% by weight of the total mass. Preferred embodiments include (1) the use of morpholine as the dechlorination inhibitor; (2) the use of 3,4-dichloroaniline as the chlorine-substituted monocarbocyclic aromatic amine, the corresponding nitro compound being 3,4-dichloro-1-nitrobenzene; (3) the use of p-chloroaniline produced from 1-chloro-4-nitrobenzene as the chloro-substituted monocarbocyclic aromatic amine; and (4) the use of 3-chloro-p-toluidine produced from 2-chloro-4-nitrotoluene as the chloro-substituted monocarbocyclic amine.

The novel hydrogenation process of this invention is conducted in standard equipment. Preferably, the hydrogenation autoclave is charged with an amount of the chloroaromatic amine product equal to between about 15% and about 35% of the total chloroaromatic amine capacity of the autoclave. The platinum catalyst and dechlorination inhibitor are also added. The mixture is heated to 95±5° C. and placed under 450±50 p.s.i.g. hydrogen pressure. For a hydrogenation that can be completed in six hours, the corresponding chlorine-substituted nitromonocarbocyclic aromatic hydrocarbon to be hydrogenated is gradually fed to the autoclave over about a five-hour period with the hydrogen pressure and temperature held within the above specified ranges of 450±50 p.s.i.g. and 95±5° C. The rate of addition per minute of the chloronitro compound for the five-hour period is about 0.33% by weight of the total amount of the chloronitro compound to be fed to the autoclave.

To illustrate with working quantities of material, let it be assumed that the autoclave has a capacity of 20,000 pounds of 3,4-dichloroaniline. The autoclave is first charged with 4,000 pounds of 3,4-dichloroaniline, i.e., 20% of the amine in a fully charged autoclave. The 3,4-dichloro-1-nitrobenzene is fed to the autoclave at a rate of about 63 pounds per minute, i.e., 0.33% per minute of 19,000 pounds of the nitro compound required to produce 16,000 pounds of 3,4-dichloroaniline over a five-hour period. Since the hydrogenation of an added increment of chloronitro compounds is complete within at most 30 minutes under the above operating conditions, the concentration of the nitro compound never exceeds 50% of the total mixture at any time.

In practice, the actual rate of hydrogenation will depend upon such factors as the proportion and efficiency of the catalyst employed, the vigor of the agitation and its suitability for entraining hydrogen into the liquid phase, the partial pressure of hydrogen, the temperature, the relative proportion of catalyst poisons such as sulfur compounds. At whatever rate the hydrogenation occurs the rate of feed of the chloronitro compound is controlled in such a way that the concentration of unreacted chloronitro compound in the reaction mass never exceeds 50%.

The process of this invention may also be operated by adding, initially, the total amount of the chloronitro compound to be hydrogenated to the reaction vessel together with the chloroaromatic amine product in such a proportion that the chloronitro compound is 50% or less of the total charge. With such proportions of chloroaromatic amine diluent and chloronitro hydrocarbon reactant nil to not over 0.1% of chlorohydrazo compound is contained in the hydrogenated product. With higher proportions of the chloronitro compound present appreciable and detrimental amounts of the chlorohydrazo compound are formed.

In the absence of the product chloroaromatic amine to serve as a diluent in the first charge of the reaction mass one of a number of other solvents may be used. Water, a reaction product of the hydrogenation, may be employed as a diluent to provide a satisfactory reaction mass in which the dispersed chloronitro compound is held within 1% to 50% of the total mixture. Suitable solvents other than the hydrogenation chloroaromatic amine product include ethanol, 2-propanol, butanol, dioxane, and the like. An obvious disadvantage of such a solvent is the need for its removal and recovery from the reduction mass. Once a stock of chloroaromatic amine is available, the amine becomes the preferred solvent-diluent for the reaction.

The hydrogen pressure may vary from about 200 to 600 p.s.i.g., a pressure of 400 to 500 p.s.i.g. being preferred. Pressures above 600 p.s.i.g. are normally unnecessary while pressures below about 200 p.s.i.g. do not always produce satisfactory results. The temperature may vary from 50° to 120° C., about 100° C. being preferred. As the temperature of hydrogenation is maintained at lower and higher temperatures than the preferred 100° C., longer and shorter overall reaction times, respectively, will be required with corresponding adjustments to lower and higher feed rates of the chloronitro compound.

The platinum catalyst consists of about 1% to 5% by weight of platinum supported on carbon and is employed in a weight ratio of chloronitro compound to platinum within the range of 25,000:1 to 125,000:1. The metal is conveniently used in the form of platinum oxide or hydroxide which under the conditions of hydrogenation is is reduced to the finely divided active metal. The catalyst containing platinum as the oxide or hydroxide may also first be reduced by treatment with a chemical reducing agent such as formaldehyde. The carbon support for the platinum may be any porous or non-porous finely divided carbon such as acetylene black, conductive furnace black, lampblack, or commercial activated carbon of vegetable or animal origin.

The dechlorination suppressor or inhibitor of the invention process may be one or more amines such as morpholine, N - methylmorpholine, N - ethylmorpholine, piperazine, N-methylpiperazine, N-ethylpiperazine, N,N′-dimethylpiperazine. Morpholine is preferred. The amount of the dechlorination suppressor needed to produce satisfactory results will vary between 0.75% and 3% by weight of the total quantity of the aromatic chloronitro compound.

The amount of chlorohydrazo compound present is determined by analysis. The analysis is based upon the fact that the hydrazo compound is insoluble in hydrochloric acid solution and is readily isolated for gravimetric determination. The analytical procedure is as follows: About 5 g. of the chloroaromatic amine which has been filtered to remove the catalyst, separated from the water of reaction, and dried is weighed to the nearest milligram and mixed with 1 liter of 10% aqueous hydrochloric acid solution. The solution is heated to between 50° and 60° C. for 30 minutes with occasional stirring and filtered through a tared crucible fitted with a fiber glass disc. After washing the residue with hot 10% HCl solution, the crucible is dried at about 115° C. and the weight of the dry residue is taken as the chlorohydrazo aromatic hydrocarbon content of the chloroaromatic amine. Analysis for the chlorohydrazo compound can also be made by vapor phase chromatography.

After the hydrogenation is completed, the reduction mass in the autoclave is filtered to recover the catalyst. The chloroaromatic amine product is separated from the water of reaction and dried.

The present invention process improvement is also applicable to a continuous hydrogenation process which produces the heretofore defined chloroaromatic amines that contain detrimental amounts of the corresponding chlorohydrazo compound.

Representative examples further illustrating the present invention follow.

Example 1

An autoclave having a capacity for 100 parts of 3,4-dichloroaniline formed by the reduction of 3,4-dichloro-1-nitrobenzene is charged with 20 parts of 3,4-dichloroaniline, 0.0013 part of platinum as 3% platinum hydroxide deposited on Shawinigan Black, and 0.75 part of morpholine. Air in the autoclave and lines is displaced by pressurizing with nitrogen and releasing the pressure through a vent system. The nitrogen is then displaced with hydrogen by successive pressurings to 450 p.s.i.g. and venting to zero. The temperature of the mixture is raised to 95° C., the agitator started and the hydrogen pressure increased to 450 p.s.i.g. 3,4-dichloro-1-nitrobenzene is then metered under pressure to the autoclave at the rate of 0.32 part per minute for five hours. The temperature is held at 95° C., and the hydrogen pressure is maintained at 450 to 500 p.s.i.g. When a total of 95 parts of 3,4-dichloro-1-nitrobenzene has been added the feed is discontinued and the hydrogenation is allowed to continue until consumption of hydrogen ceases (usually about 45 minutes).

The reaction mass is cooled to 85° C. and filtered. The filtrate is allowed to separate into layers. The lower 3,4-dichloroaniline layer is drawn off. The dichloroaniline is dried by heating at 100±10° C. at 100 mm. Hg pressure to yield essentially pure 3,4-dichloroaniline having a freezing point of 70.7° C. and containing no 3,3′,4,4′-tetrachlorohydrazobenzene as measured by analysis for acid insoluble material and by vapor phase chromatography. The 3,4-dichloroaniline is acceptable as a chemical intermediate without further purification.

When the same procedure is followed except that the autoclave is initially charged with 120 parts of 3,4-dichloro-1-nitrobenzene in the absence of any 3,4-dichloroaniline the final 3,4-chloroaniline product contains 0.5% of 3,3′,4,4′-tetrachlorohydrazobenzene which impairs the use of the 3,4-dichloroanaline for some important applications and must be removed by a suitable means such as fractional distillation.

Example 2

An autoclave is charged with 21 parts of 1-chloro-4-nitrobenzene, 0.6 parts of morpholine, and 0.007 part of platinum on carbon and the hydrogenation of the nitro compound is accomplished at 95° C. and 2000 p.s.i.g. hydrogen pressure. Absorption of hydrogen is rapid with evolution of heat. The total hydrogenation time is 70 minutes.

After isolating and drying the p-chloroaniline product it is found to have a 4,4′-dichlorohydrazobenzene content of 0.4%.

The hydrogenation of 1-chloro-4-nitrobenzene is repeated with the following change in procedure. The autoclave is charged with 22 parts of p-chloroaniline, 0.6 part of morpholine, and 0.007 part of platinum on carbon, 18 parts of 1-chloro-4-nitrobenzene and brought to 95° C. under 200 p.s.i.g. pressure of hydrogen. Absorption of hydrogen begins immediately with evaluation of heat. The hydrogenation time is about 75 minutes.

The p-chloroaniline obtained under these conditions, where the concentration of the 1-chloro-4-nitrobenzene in the mixture with the p-chloroaniline is held below 50%, contains only 0.1% 4,4'-dichlorohydrazobenzene and is acceptable for use without further purification.

*Example 3*

The procedure of Example 1 wherein the nitro compound is gradually fed to a pool of amine hydrogenation product in the autoclave of Example 2 is repeated with 7 parts of 3-chloro-p-toluidine charged to the autoclave and 17 parts of 2-chloro-4-nitrotoluene gradually added over a period of 2⅔ hours. The 3-chloro-p-toluidine obtained contains none of the corresponding intermediate hydrazo compound, 1,2-bis(3-chloro-p-tolyl)hydrazine, and is an improved, acceptable commercial product without further purification.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments described herein.

The embodiments of the invention in which a particular property or privilege is claimed are as follows:

1. In the process for producing a mono- or dichloroaniline having zero through two methyl groups by the hydrogenation of the corresponding mono- or dichloronitrobenzene in the presence of a dechlorination inhibitor and a platinum hydrogenation catalyst; the improvement which comprises minimizing the formation of chlorohydrazo aromatic hydrocarbon impurities by adding to the initial reaction mixture a sufficient amount of said mono- or dichloroaniline so as to maintain the amount of said mono- or dichloronitrobenzene between one and fifty percent by weight of the combined weight of the mono- or dichloroaniline and the mono- or dichloronitrobenzene.

2. A process according to claim 1 wherein the dechlorination inhibitor is morpholine, piperazine or an N-methylor N-ethyl derivative thereof.

3. A process according to claim 1 wherein said mono- or dichloronitrobenzene is fed into a mixture of said mono- or dichloroaniline, dechlorination inhibitor and platinum catalyst, at such a rate so as to maintain the amount of said mono- or dichloronitrobenzene in the mixture between one and fifty percent of the combined weight of mono- or dichloroaniline and the mono- or dichloronitrobenzene.

4. A process according to claim 1 wherein said dechlorination inhibitor is morpholine.

5. A process according to claim 1 wherein the mono- or dichloroaniline is 3,4-dichloroaniline and the corresponding nitro compound is 3,4-dichloro-1-nitrobenzene.

6. A process according to claim 1 wherein the mono- or dichloroaniline is p-chloroaniline produced from 1-chloro-4-nitrobenzene.

7. A process according to claim 1 wherein the mono- or dichloroaniline is 3-chloro-p-toluidine produced from 2-chloro-4-nitrotoluidine.

References Cited

UNITED STATES PATENTS 3,145,231   8/1964   Kosak _____ 260—580

CHARLES B. PARKER, *Primary Examiner.*

N. WICZER, P. C. IVES, *Assistant Examinners.*